US011586475B2

(12) United States Patent
Basu et al.

(10) Patent No.: US 11,586,475 B2
(45) Date of Patent: Feb. 21, 2023

(54) APPLICATION AWARE RESOURCE ALLOCATION FOR DEEP LEARNING JOB SCHEDULING

(71) Applicant: International Business Machines Corporation, Armonk, NY (US)

(72) Inventors: Saurav Basu, Bangalore (IN); Vaibhav Saxena, Vasant Kunj (IN); Yogish Sabharwal, Gurgaon (IN); Ashish Verma, Nanuet, NY (US); Jayaram Kallapalayam Radhakrishnan, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 16/804,748

(22) Filed: Feb. 28, 2020

(65) Prior Publication Data
US 2021/0271520 A1 Sep. 2, 2021

(51) Int. Cl.
*G06F 9/46* (2006.01)
*G06F 9/50* (2006.01)
*G06F 9/48* (2006.01)
*G06N 3/08* (2023.01)

(52) U.S. Cl.
CPC .......... *G06F 9/5055* (2013.01); *G06F 9/4881* (2013.01); *G06N 3/08* (2013.01)

(58) Field of Classification Search
None
See application file for complete search history.

(56) References Cited

U.S. PATENT DOCUMENTS

| 9,633,315 B2 | 4/2017 | Chapelle et al. |
| 9,767,018 B2* | 9/2017 | Gracie ................ G06F 12/0253 |
| 10,884,795 B2* | 1/2021 | Liu ........................ G06F 9/5083 |

(Continued)

FOREIGN PATENT DOCUMENTS

CN 107203424 A 9/2017

OTHER PUBLICATIONS

Zhang et al. "Energy-Efficient Scheduling for Real-Time Systems Based on Deep Q-Learning Model", 2017 IEEE, pp. 132-141.*

(Continued)

*Primary Examiner* — Van H Nguyen
(74) *Attorney, Agent, or Firm* — Ference & Associates LLC

(57) ABSTRACT

One embodiment provides a method, including: receiving at least one deep learning job for scheduling and running on a distributed system comprising a plurality of nodes; receiving a batch size range indicating a minimum batch size and a maximum batch size that can be utilized for running the at least one deep learning job; determining a plurality of runtime estimations for running the at least one deep learning job; creating a list of optimal combinations of (i) batch sizes and (ii) numbers of the plurality of nodes for running both (a) the at least one deep learning job and (b) current deep learning jobs; and scheduling the at least one deep-learning job at the distributed system, responsive to identifying, by utilizing the list, that the distributed system has necessary processing resources for running both (iii) the at least one deep learning job and (iv) the current deep learning jobs.

20 Claims, 4 Drawing Sheets

(56) References Cited

U.S. PATENT DOCUMENTS

| 11,263,052 | B2* | 3/2022 | Saxena | G06F 9/544 |
|---|---|---|---|---|
| 2009/0172674 | A1* | 7/2009 | Bobak | G06F 11/1482 |
| | | | | 718/101 |
| 2019/0095783 | A1* | 3/2019 | Kim | G06N 3/0472 |

OTHER PUBLICATIONS

Yixin Bao et al., "Online Job Scheduling in Distributed Machine Learning Clusters", Jan. 3, 2018, 14 pages, arXiv:1801.00936v1 [cs.DC].

Artan Mazrekaj et al., "Pricing Schemes in Cloud Computing: An Overview", International Journal of Advanced Computer Science and Applications (IJACSA), Feb. 2016, 8 pages, vol. 7, No. 2, ResearchGate.

Erci Xu et al., "Revisiting Resource Management for Deep Learning Framework", Electronics 2019, Mar. 16, 2019, 11 pages, MDPI.

Aarthi Raveendran, B.S., "A Framework for Elastic Execution of Existing MPI Programs", Thesis—Conference Paper, Jun. 2011, 62 pages, ResearchGate.

He Huang et al., "CAP3: A Cloud Auto-Provisioning Framework for Parallel Processing Using On-demand and Spot Instances", 2013, 8 pages, Copy available at: https://www.cs.uwyo.edu/~lwang7/papers/Cloud-2013.pdf.

Aurick Qiao et al., "Litz: Elastic Framework for High-Performance Distributed Machine Learning", 2018 USENIX Annual Technical Conference, Jul. 11-13, 2018, Boston, MA, USA, 14 pages, USENIX Association.

Yanghua Peng et al., "Optimus: An Efficient Dynamic Resource Scheduler for Deep Learning Clusters", EuroSys 18, Apr. 23-26, 2018, Porto, Portugal, 14 pages, Association for Computing Machinery.

Wencong Xiao et al., "Gandiva: Introspective Cluster Scheduling for Deep Learning", 13th USENIX Symposium on Operating Systems Design and Implementation, Oct. 8-10, 2018, Carlsbad, CA, USA, 17 pages, USENIX Association.

* cited by examiner

APPLICATION AWARE RESOURCE ALLOCATION FOR DEEP LEARNING JOB SCHEDULING

BACKGROUND

To run Deep Learning (DL) jobs requires many processing resources and time. Utilizing a standard processing system to run these jobs is inefficient and may cause problems with other tasks that the systems are designed to perform. For example, if a system that is designed for management of a corporate enterprise is also utilized for running deep learning jobs, the ability of the system to perform the corporate enterprise management tasks may suffer due to the extensive resources and time that need to be allocated to the deep learning jobs. Accordingly, systems have been developed specifically for running deep learning jobs. These systems are typically distributed systems (e.g., clusters, clouds, etc.) that include multiple nodes that share the running of a deep learning job. Since the system is particularly designed for running deep learning jobs, the system utilizes its resources to run multiple deep learning jobs at the same time by allocating resources of the system to different portions of different jobs.

BRIEF SUMMARY

In summary, one aspect of the invention provides a method, comprising: receiving at least one deep learning job for scheduling and running on a distributed system comprising a plurality of nodes, wherein at least a subset of the plurality of nodes works together to run a deep learning job; receiving, for the at least one deep learning job, a batch size range indicating a minimum batch size and a maximum batch size that can be utilized for running the at least one deep learning job; determining a plurality of runtime estimations for running the at least one deep learning job, wherein the plurality of runtime estimations corresponds to runtime estimation combinations having differing batch sizes and differing numbers of nodes for running the at least one deep learning job; creating a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and scheduling the at least one deep-learning job at the distributed system, responsive to identifying, by utilizing the list, that the distributed system has necessary processing resources for running both (iii) the at least one deep learning job and (iv) the current deep learning jobs.

Another aspect of the invention provides an apparatus, comprising: at least one processor; and a computer readable storage medium having computer readable program code embodied therewith and executable by the at least one processor, the computer readable program code comprising: computer readable program code configured to receive at least one deep learning job for scheduling and running on a distributed system comprising a plurality of nodes, wherein at least a subset of the plurality of nodes works together to run a deep learning job; computer readable program code configured to receive, for the at least one deep learning job, a batch size range indicating a minimum batch size and a maximum batch size that can be utilized for running the at least one deep learning job; computer readable program code configured to determine a plurality of runtime estimations for running the at least one deep learning job, wherein the plurality of runtime estimations corresponds to runtime estimation combinations having differing batch sizes and differing numbers of nodes for running the at least one deep learning job; computer readable program code configured to create a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and computer readable program code configured to schedule the at least one deep-learning job at the distributed system, responsive to identifying, by utilizing the list, that the distributed system has necessary processing resources for running both (iii) the at least one deep learning job and (iv) the current deep learning jobs.

An additional aspect of the invention provides a computer program product, comprising: a computer readable storage medium having computer readable program code embodied therewith, the computer readable program code executable by a processor and comprising: computer readable program code configured to receive at least one deep learning job for scheduling and running on a distributed system comprising a plurality of nodes, wherein at least a subset of the plurality of nodes works together to run a deep learning job; computer readable program code configured to receive, for the at least one deep learning job, a batch size range indicating a minimum batch size and a maximum batch size that can be utilized for running the at least one deep learning job; computer readable program code configured to determine a plurality of runtime estimations for running the at least one deep learning job, wherein the plurality of runtime estimations corresponds to runtime estimation combinations having differing batch sizes and differing numbers of nodes for running the at least one deep learning job; computer readable program code configured to create a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and computer readable program code configured to schedule the at least one deep-learning job at the distributed system, responsive to identifying, by utilizing the list, that the distributed system has necessary processing resources for running both (iii) the at least one deep learning job and (iv) the current deep learning jobs.

A further aspect of the invention provides a method, comprising: receiving a list of (i) jobs currently running on a distributed system and (ii) pending jobs to be scheduled for running on the distributed system, wherein the distributed system comprises a plurality of computing nodes, wherein a subset of the plurality of computing nodes are utilized to run a job; generating, for each of the pending jobs, a list of runtime estimations identifying runtime values for running a corresponding pending job utilizing (i) differing batch sizes and (ii) differing numbers of computing nodes, wherein the differing batch sizes comprise batch sizes within a batch size range allowed for the corresponding pending job; creating an optimized list comprising optimized combinations of batch size and number of computing nodes for running both (iii) the jobs currently running and (iv) the pending jobs on the distributed system, wherein batch size/number of computing node combinations for the pending jobs are based upon the list of runtime estimations for the corresponding pending job; determining that the distributed system comprises sufficient computing resources to execute the optimized list; and thereafter scheduling both (v) the jobs currently running and (vi) the pending jobs on the distributed system, wherein the scheduling comprises reallocating the computing resources of the distributed system to execute the optimized list.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
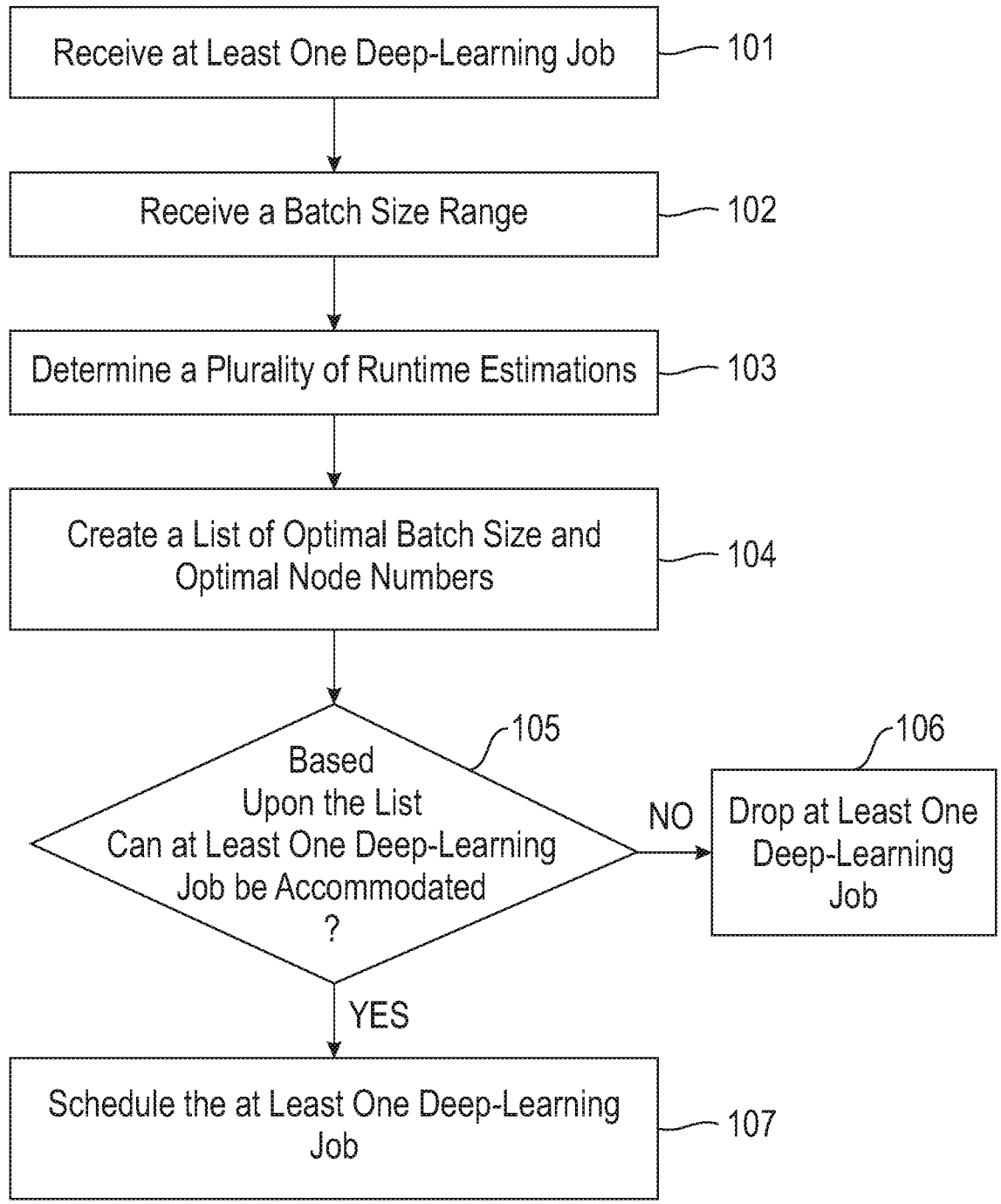
FIG. 1 illustrates a method of scheduling deep learning jobs on a distributed system while maintaining accuracy of the jobs, optimizing use of the distributed system resources, and reducing a drop rate of jobs by adjusting batch size and the number of nodes used in running the jobs.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

When a new deep learning job is received at a distributed system, the system determines whether the job can be run. If the new job cannot be run, the system drops the job, meaning the job is not run. Such a situation is undesirable. Accordingly, traditional distributed system scheduling has been modified in order to reduce the drop rate of jobs. Traditional high-performance computing (HPC) systems that run non-deep learning jobs, for example, parallel matrix multiplication, parallel solvers, weather simulation, and the like, change the runtime behavior of the jobs by scaling to different numbers of computing nodes within the distributed system having a fixed number of total nodes. Such scaling of jobs within the distributed system is referred to as job elasticity, which is the ability of the system to increase or decrease an attribute of the system that is running the job. For example, in traditional systems, the job elasticity refers to increasing or decreasing the number of computing resources or nodes that are utilized for running the job.

Thus, in traditional systems, to scale the jobs with a fixed total workload or problem size, the system increases the number of nodes that the jobs are run through, thereby reducing the workload for each computing resource or node. In other words, the jobs are spread out across more nodes so that each individual node has a reduced workload. Similarly, for traditional systems that run deep learning jobs with a fixed total batch size, only the number of nodes running the job is changed which, in turn, increases or decreases the DL workload for each node. Such conventional systems do not change any application-specific parameters of the DL job in order to increase the system utilization and reduce the drop rate of incoming/new DL jobs. Adjusting application-specific parameters for a DL job refers to adjusting hyper-parameters of the job, such as batch size, and not just the number of nodes. However, the traditional scaling systems do not adjust the application-specific parameters of the job and only change the number of nodes.

Additionally, once a HPC (non-DL distributed) job has started running on a conventional system, it is usually run with a fixed number of nodes until completion of the job without elasticity or, stated differently, scaling the number of nodes while the job is being run. However, this may result in sub-optimal usage of system resources if there are idle resources available on the system or if many new jobs get submitted. Thus, the traditional systems, which run distributed DL jobs similar to non-DL distributed job systems, do not optimize the system utilization and result in an undesirable job drop rate.

Accordingly, an embodiment provides a system and method for scheduling deep learning jobs on a distributed system while maintaining accuracy of the jobs, optimizing use of the distributed system resources, and reducing a drop rate of jobs by adjusting batch size and the number of nodes used in running the jobs. The system receives a new deep learning job for scheduling and running on the distributed system that includes a plurality of nodes. The distributed system also includes jobs that are currently being run on the distributed system. When running jobs within the distributed system, one or more of the nodes of the distributed system may communicate together to run a portion of the job. In other words, the job may be run utilizing one or more of the nodes within the distributed system. When receiving the new deep learning job, the system may receive a batch size range that identifies a minimum batch size and a maximum batch size that can be utilized for running the job. The batch size refers to the number of data samples in a single batch of input data of the DL job. The input data get processed in batches, and each batch is run on a single node or multiple nodes at a time. For example, if two nodes are used in a DL job and, if the batch size is 64, then each node may process 32 samples at a time.

Using the batch size range and the number of nodes within the distributed system that could potentially process the job, the system constructs a plurality of runtime estimations. The runtime estimations correspond to different combinations of batch sizes and node numbers for running the job. For example, one runtime estimation may correspond to a batch size of 64 being run on a single node, whereas another runtime estimation may correspond to the same batch size of 64 but being run on two nodes, with 32 per node in this example. Using the runtime estimations for the new job and taking into account jobs currently running on the distributed system, including batch size ranges for those jobs, the system creates a list of optimal combinations of batch sizes and numbers of nodes for running both the current jobs and the new job. If, based upon the list, the system identifies that the distributed system has the processing resources necessary for running both the current jobs and the new job, the system schedules the new job to the system. Scheduling the new job may include reallocating resources of the currently running jobs and assigning resources to the new job. Accordingly, the system may scale the current jobs as they are running on the distributed system to account for the new job.

Such a system provides a technical improvement over current systems for running deep learning jobs on a distributed system. The described system is able to receive new deep learning jobs that will be efficiently run on the distributed system. By determining runtime estimations for combinations of batch sizes, an application-specific parameter, and numbers of nodes running the job, the system can optimize the resources of the distributed system to run the new job and the currently running jobs, thereby resulting in better system utilization by efficiently allocating the distributed system computing resources, which is not currently done in conventional systems. Additionally, since, in addition to optimizing the resources, the system can alter resource allocation to currently running jobs, taking into account the batch size range of the currently running jobs, the system can reduce the drop rate of new jobs as compared to traditional systems. Thus, the described system and method are more efficient than conventional systems and result in better system utilization and reduced drop rates as compared to the conventional systems that schedule and allocate resources to distributed DL jobs similar to non-DL distributed jobs.

FIG. 1 illustrates a method for scheduling deep learning jobs on a distributed system while maintaining accuracy of the jobs, optimizing use of the distributed system resources, and reducing a drop rate of jobs by adjusting batch size and the number of nodes used in running the jobs. At 101 the system receives at least one deep learning (DL) job for scheduling and running on a distributed system, referred to as a new job. For ease of readability, the remaining discussion will refer to a single new job that is received. However, it should be understood that more than one new job may be received at a time and the system can still analyze the resources, determine if any or all of the new jobs can be accounted for based upon the resources of the distributed system and the currently running jobs, and thereafter schedule those new jobs that can be fulfilled by the system. Example distributed systems include a cloud system, cluster system, and the like.

A distributed system is a system that includes many nodes that can communicate with each other and work in conjunction with each other to run a single job. Thus, subsets of the nodes work together to run jobs on the distributed system. For example, one node may run a portion of a job while another node runs another portion of the job, thus creating a subset of two nodes. It should be understood that the term subset can also refer to a single node. For example, a single node may run the entirety of a job. A subset can also refer to all of the nodes of the distributed system. For example, every node within the distributed system can run a portion of a single job. Additionally, a single node can run multiple jobs simultaneously, for example, a portion of one job and the entirety of another job, or a portion of one job and a portion of another job. It should also be understood that the subset of nodes does not have to be the same for the entirety of a job. For example, node A and node B may work together to run the job and then upon rescaling, node A, node C, and node D may work together to continue running the job. Additionally, the same subsets of nodes do not have to work together on every job. For example, job 1 may run on node A and node B, whereas job 2 may run on node B and node D.

At 102 the system receives a batch size range for the new job. Batch size refers to the number of samples in a single batch of input data for the DL job that is being run on a single node or multiple nodes at a time. The batch size range indicates a minimum batch size and a maximum batch size that can be utilized when running the new job. The batch size range is provided by a user. The batch size range is the range of batch sizes that can be utilized for running the job while still maintaining the accuracy of the job. The same batch sizes do not have to be utilized for every node that is used for running the job. For example, one node may run with a 64 batch size while another node runs with a 256 batch size. However, the total batch size across all the nodes used for running the job needs to fall within the batch size range corresponding to the job. With the batch size range, the system may also receive or identify other batch size parameters, for example, that a particular node or node type has a certain batch size, a particular job type or job portion type has a batch size, or the like.

In addition to the batch size range, the system may receive or identify other job characteristics, for example, the type of data that is being utilized in the job, the model that is being used in the deep learning job, hyper-parameter values, and the like. Hyper-parameters are those parameters whose value is usually set before the learning process or running is started as opposed to those parameters that are derived via training. Hyper-parameters may affect the computational speed and predictive quality of the job and some examples include learning rate, momentum, batch size, size of the model, and the like. The system may also receive or identify distributed system parameters, also referred to as cluster or cloud parameters. Some example distributed system parameters include the configuration of the distributed system, how many nodes are included in the distributed system, the type of communication that exists in the distributed system, and the like.

Figure 2:
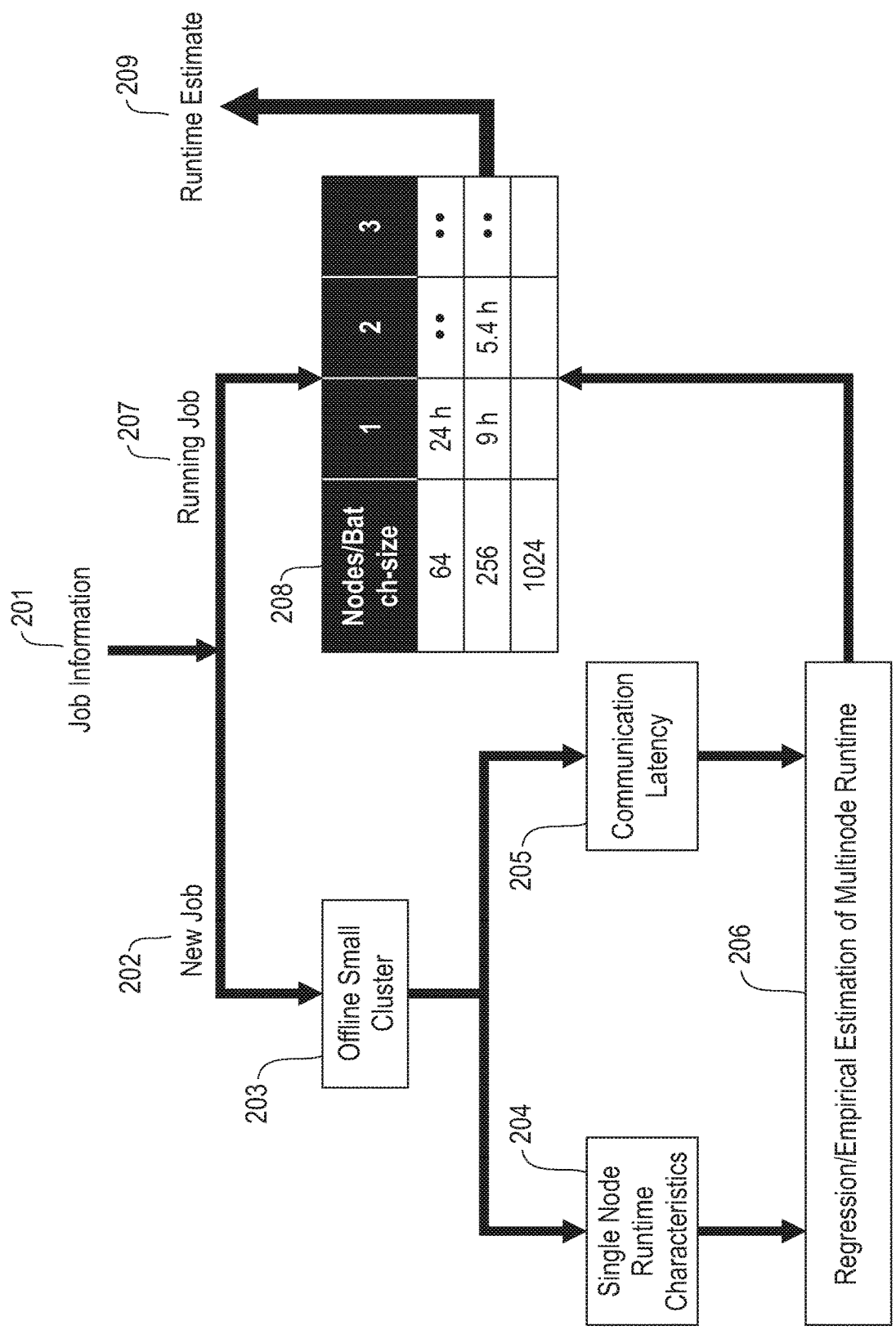
FIG. 2 illustrates an example runtime estimation engine for generating runtime estimations for pending jobs.

At 103 the system may determine a plurality of runtime estimations for running the new job. Runtime estimations correspond to an estimation of a length of time that will be necessary for running the job. Each of the runtime estimations corresponds to a combination of a batch size and a number of nodes used to run the new job. Thus, the plurality of runtime estimations corresponds to runtime estimation combinations having differing batch sizes and differing numbers of nodes for running the new job. The system may use a runtime estimation engine to create the runtime estimations. An example of the runtime estimation engine is shown in FIG. 2.

The runtime estimation engine may get the job information 201. If the job is a new job 202, the runtime estimation engine may determine a single node runtime by running the new job offline on a single node. The single node may include a small offline cluster 203. Running the job offline on a single node may include running just a portion of the job to determine the single node runtime or it may include running the entirety of the job. After running the new job offline, the runtime estimation engine is able to identify single node runtime characteristics 204, for example, the length of time required to run the job on a single node, the performance characteristics of the node required to meet that run time, and the like.

The runtime estimation engine also identifies characteristics of the distributed system, for example, the communication latency 205 based upon characteristics of the distributed system. The communication latency identifies a length of time or lag caused by nodes within the distributed system communicating with each other. In other words, the value of the communication latency corresponds to a time value for one of the nodes to communicate with another of the nodes. The communication latency can be determined using distributed system characteristics such as the number of nodes within the system, the communication type of the system, type of integration network utilized by the system, communication bandwidth characteristics, and the like. The communication latency may be an average communication latency for the entire distributed system, or it may be for particular nodes or sets of nodes within the distributed system.

The runtime estimation engine utilizes the single node runtime characteristics 204 and communication latency 205 to build a regression model or empirical estimation of multimode runtimes 206. In other words, utilizing the known single node runtime characteristics 204 and the communication latency 205 of the distributed system, the runtime estimation engine can estimate runtimes based upon utilizing different numbers of nodes and batch sizes to run the job. The engine can then build a runtime estimation table or list 208 of runtimes in view of number of nodes and batch sizes. This table or list identifies how long it will take to run the job when utilizing differing numbers of nodes with differing batch sizes. In building this list or table, the system also takes, as input, characteristics of running jobs 207. If the characteristics of the new job are identical to a currently running job, then the engine may choose to reuse the runtime information of the running job for the new job instead of re-estimating the new job's runtime. The engine determines the runtime of different jobs, both the new jobs and the currently running jobs, on different numbers of nodes and different batch sizes. This list or table is then returned as the runtime estimate 209.

At 104 the system creates a list of optical combinations of batch sizes and numbers of nodes for running not only the new job, but also the current jobs that are currently being run on the distributed system. To create the list, the system utilizes an optimizer that takes as input the runtime estimates generated by the runtime estimation engine to determine the batch size and number of nodes that should be allocated to a particular job on the distributed system. In other words, the optimizer uses the runtime estimations to determine the optical combination of the batch size and number of nodes that should be allocated to the new job and the current jobs.

When determining the optimal combination of batch size and number of nodes to be allocated to a particular job, the optimizer allocates more resources to a job whose runtime or computational performance is improved the most by the additional resources. For example, if doubling the resources for one job reduces the runtime for that job by a third, but allocating those same resources to another job reduces the runtime for the another job by half, the optimizer would allocate the resources to the another job. Allocating resources in this manner results in the most efficient use of resources. Thus, the optimizer optimizes the resources that need to be allocated to each job by determining an optical combination of the number of nodes to allocate to a job and the batch size to be used for each of the current jobs and the new job. The optimizer creates a list of valid combinations of batch size and computing nodes for each current job and the new job that maximizes progress, minimizes remaining time, and the like. A valid combination refers to a combination that has a batch size falling within the batch size range and a number of nodes that is supportable by the system.

In creating the list, the optimizer may identify adjustments for batch sizes for current jobs based upon the batch size ranges for those jobs. In other words, not only does the new job have a batch size range, but the current jobs also have batch size ranges. In determining batch sizes for the current jobs, and the new job, the optimizer takes into account the allowable batch sizes based upon the batch size ranges in order to maintain the accuracy of the jobs. Thus, when adjusting the batch sizes for the current jobs, the optimizer maintains batch sizes that are within the batch size range for the job. The optimizer can also identify adjustments for other hyper-parameters for the both the new job and the current jobs. In other words, the optimizer can utilize scaling properties for each of the current jobs and the new job.

Once the optimizer has created the list of optimal combinations of batch sizes and numbers of nodes for both the new job and the current jobs, the system determines if the new job can be accommodated at 105. To determine if the new job can be accommodated, the system determines if the distributed system capacity is exceeded based upon the list. In other words, if the number of resources needed to fulfill the list is greater than the number of resources in the distributed system, then the capacity is exceeded and the new job cannot be accommodated. Additionally, a new job may not be able to be accommodated if the scheduling identified by the list is infeasible.

If the new job cannot be accommodated the new job is dropped at 106. In other words, if the system identifies, based upon the list, that the distributed system does not have the necessary processing resources for running both the new job and the current jobs, the new job is dropped. If, on the other hand, the system identifies, based upon the list, that the new job can be accommodated, the system schedules the new job at the distributed system at 107. In other words, if the system identifies, based upon the list, that the distributed system has the necessary processing resources for running both the new job and the current jobs, the new job is scheduled with an identified number of nodes and batch sizes. Scheduling the new job may also include adjusting the current jobs. Adjusting the current jobs may include adjusting the number of nodes and/or a batch size and/or hyper-parameters for one or more of the current jobs to account for running the new job. In other words, the system can adjust the current jobs in order to schedule the processing resources of the distributed system for the current jobs and the new jobs to match the list generated by the optimizer.

Figure 3:
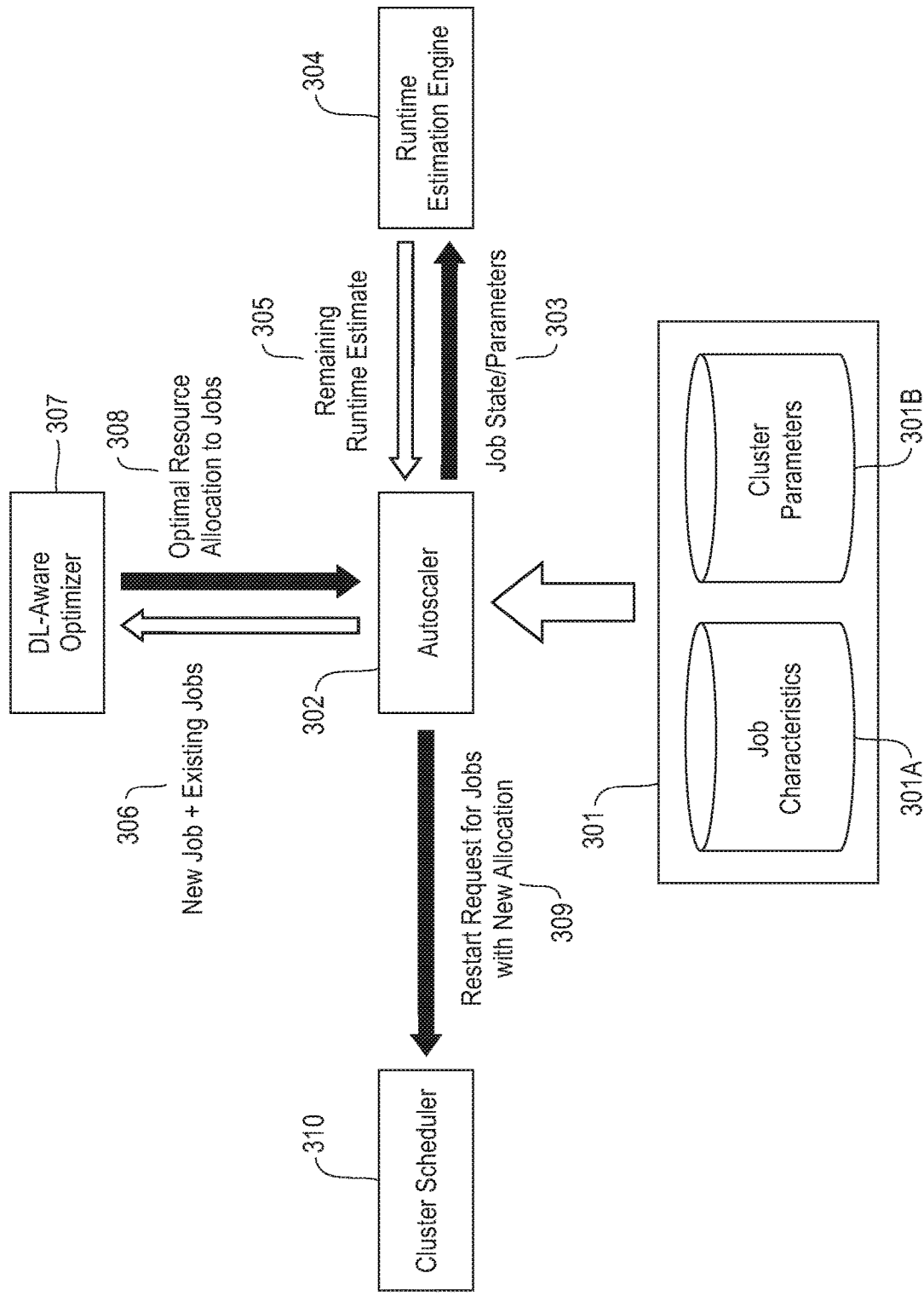
FIG. 3 illustrates an example system architecture for scheduling deep learning jobs on a distributed system while maintaining accuracy of the jobs, optimizing use of the distributed system resources, and reducing a drop rate of jobs by adjusting batch size and the number of nodes used in running the jobs.

FIG. 3 illustrates an overall example of the system architecture. An autoscaler 302, which is a module that acts as the processing unit for the system, receives input 301 in the form of job characteristics 301A corresponding to the new job and cluster or distributed system parameters 301B. The autoscaler 302 sends this information to the runtime estimation engine 304. The runtime estimation engine 304 generates a list of runtime estimations for the new job and returns remaining runtime estimates 305 to the autoscaler 302. The remaining runtime estimates are provided for the currently running jobs since they may have already run for some time before the new job was received. Thus, the list generated by the runtime estimation engine 304 includes runtime estimates for the new job and remaining runtime estimates for the jobs that have already be started and have been running. The autoscaler 302 provides the runtime estimates 305 for the new job and remaining runtime estimates for the current or existing jobs 306 to a deep learning-aware optimizer 307. The deep learning-aware optimizer 307 takes into account batch size range and other provided hyper-parameters which are specific to DL jobs and not non-DL distributed jobs. The optimizer 307 generates a list of optimal combinations of resource allocations along with the batch size for the new job and current jobs 308 and returns this to the autoscaler 302. If the new job can be accommodated the autoscaler 302 sends a restart request to the current jobs and starts the new job with the new allocations 309 to the cluster scheduler 310 which schedules the jobs for running on cluster or distributed system processing resources.

Thus, the described systems and methods represent a technical improvement over current systems for running deep learning jobs on a distributed system. The described systems and methods provide a technique that allows for modification of application-specific parameters, for example, the batch size, which results in better system utilization as compared to conventional systems. Additionally, since the system is being better utilized, the system is able to account for additional new job more efficiently, thereby reducing the drop rate of jobs on the distributed system. Thus, the described system and method provide more efficiency and better system utilization within a distributed system in addition to a reduced drop rate as compared with conventional distributed systems.

Figure 4:
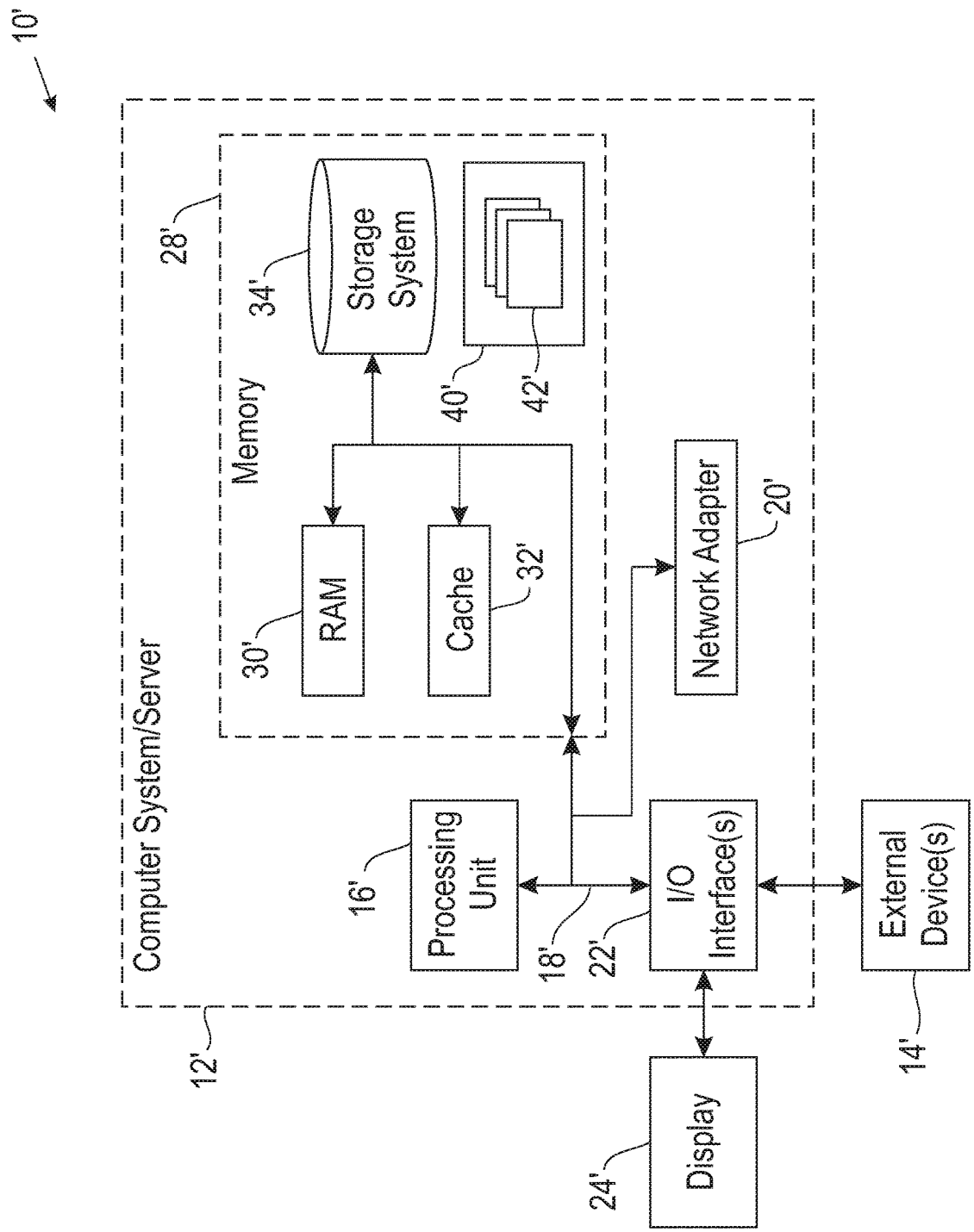
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving at least one deep learning job for scheduling and running on a distributed system comprising a plurality of nodes, wherein at least a subset of the plurality of nodes works together to run the at least one deep learning job;
   receiving, for the at least one deep learning job, a batch size range indicating a minimum batch size and a maximum batch size that can be utilized for running the at least one deep learning job;
   determining a plurality of runtime estimations for running the at least one deep learning job, wherein the plurality of runtime estimations corresponds to runtime estimation combinations having differing batch sizes and differing numbers of nodes for running the at least one deep learning job;
   creating a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and
   scheduling the at least one deep-learning job at the distributed system, responsive to identifying, by utilizing the list, that the distributed system has necessary processing resources for running both (iii) the at least one deep learning job and (iv) the current deep learning jobs.

2. The method of claim 1, wherein the determining a plurality of runtime estimations comprises determining a single node runtime of the at least one deep learning job when run on a single node.

3. The method of claim 1, wherein the determining a plurality of runtime estimations comprises identifying a communication latency value of the distributed system, the communication latency value corresponding to a time value for one of the plurality of nodes to communicate with another of the plurality of nodes.

4. The method of claim 3, wherein the determining a plurality of runtime estimations comprises estimating runtimes for distributing and running the at least one deep learning job across more than one of the plurality of nodes, the estimating being based upon (i) a single node runtime and (ii) the communication latency value.

5. The method of claim 1, wherein the scheduling comprises adjusting at least one of (i) a number of nodes and (ii) a batch size for at least one deep learning job currently running on the distributed system to account for running the at least one deep learning job.

6. The method of claim 1, wherein the creating a list comprises adjusting batch sizes for current deep learning jobs in view of batch size ranges corresponding to the current deep learning jobs.

7. The method of claim 1, wherein the creating a list comprises allocating processing resources within the distributed system to a configuration of both the at least one deep learning job and the current deep learning jobs, thereby resulting in a more efficient use of the processing resources as compared to an allocation of processing resources to a different configuration of both the at least one deep learning job and the current deep learning jobs.

8. The method of claim 1, comprising dropping the at least one deep learning job, responsive to identifying, by utilizing the list, the distributed system does not have necessary processing resources for running both the at least one deep learning job and the current deep learning jobs.

9. The method of claim 1, wherein the batch size range is determined by identifying the minimum batch size and the maximum batch size that can be utilized for running the at least one deep learning job, while maintaining accuracy of the at least one deep learning job.

10. The method of claim 1, wherein the creating a list comprises identifying adjustments of hyper-parameters for both the at least one deep learning job and the current deep learning jobs.

11. An apparatus, comprising:
    at least one processor; and
    a computer readable storage medium having computer readable program code embodied therewith and executed by the at least one processor, the computer readable program code comprising:
    computer readable program code configured to receive at least one deep learning job for scheduling and running on a distributed system comprising a plurality of nodes, wherein at least a subset of the plurality of nodes works together to run the at least one deep learning job;
    computer readable program code configured to receive, for the at least one deep learning job, a batch size range indicating a minimum batch size and a maximum batch size that can be utilized for running the at least one deep learning job;
    computer readable program code configured to determine a plurality of runtime estimations for running the at least one deep learning job, wherein the plurality of runtime estimations corresponds to runtime estimation combinations having differing batch sizes and differing numbers of nodes for running the at least one deep learning job;
    computer readable program code configured to create a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and computer readable program code configured to schedule the at least one deep-learning job at the distributed system, responsive to identifying, by utilizing the list, that the distributed system has necessary processing resources for running both (iii) the at least one deep learning job and (iv) the current deep learning jobs.

12. A computer program product, comprising:

a computer readable storage medium having computer readable program code embodied therewith, the computer readable program code executed by a processor and comprising:

computer readable program code configured to receive at least one deep learning job for scheduling and running on a distributed system comprising a plurality of nodes, wherein at least a subset of the plurality of nodes works together to run the at least one deep learning job;

computer readable program code configured to receive, for the at least one deep learning job, a batch size range indicating a minimum batch size and a maximum batch size that can be utilized for running the at least one deep learning job;

computer readable program code configured to determine a plurality of runtime estimations for running the at least one deep learning job, wherein the plurality of runtime estimations corresponds to runtime estimation combinations having differing batch sizes and differing numbers of nodes for running the at least one deep learning job;

computer readable program code configured to create a list of optimal combinations of (i) batch sizes and (ii) numbers of the plurality of nodes for running both (a) the at least one deep learning job and (b) current deep learning jobs being run on the distributed system, wherein the batch size and the number of plurality of nodes for a combination corresponding to the at least one deep learning job are determined using the plurality of runtime estimations; and computer readable program code configured to schedule the at least one deep-learning job at the distributed system, responsive to identifying, by utilizing the list, that the distributed system has necessary processing resources for running both (iii) the at least one deep learning job and (iv) the current deep learning jobs.

13. The computer program product of claim 12, wherein the determining a plurality of runtime estimations comprises determining a single node runtime of the at least one deep learning job when run on a single node.

14. The computer program product of claim 12, wherein the determining a plurality of runtime estimations comprises identifying a communication latency value of the distributed system, the communication latency value corresponding to a time value for one of the plurality of nodes to communicate with another of the plurality of nodes.

15. The computer program product of claim 14, wherein the determining a plurality of runtime estimations comprises estimating runtimes for distributing and running the at least one deep learning job across more than one of the plurality of nodes, the estimating being based upon (i) a single node runtime and (ii) the communication latency value.

16. The computer program product of claim 12, wherein the scheduling comprises adjusting at least one of (i) a number of nodes and (ii) a batch size for at least one deep learning job currently running on the distributed system to account for running the at least one deep learning job.

17. The computer program product of claim 12, wherein the creating a list comprises adjusting batch sizes for current deep learning jobs in view of batch size ranges corresponding to the current deep learning jobs.

18. The computer program product of claim 12, wherein the creating a list comprises allocating processing resources within the distributed system to a configuration of both the at least one deep learning job and the current deep learning jobs, thereby resulting in a more efficient use of the processing resources as compared to an allocation of processing resources to a different configuration of both the at least one deep learning job and the current deep learning jobs.

19. The computer program product of claim 12, comprising dropping the at least one deep learning job, responsive to identifying, by utilizing the list, the distributed system does not have necessary processing resources for running both the at least one deep learning job and the current deep learning jobs.

20. A method, comprising:

receiving a list of (i) jobs currently running on a distributed system and (ii) pending jobs to be scheduled for running on the distributed system, wherein the distributed system comprises a plurality of computing nodes, wherein a subset of the plurality of computing nodes are utilized to run a job;

generating, for each of the pending jobs, a list of runtime estimations identifying runtime values for running a corresponding pending job utilizing (i) differing batch sizes and (ii) differing numbers of computing nodes, wherein the differing batch sizes comprise batch sizes within a batch size range allowed for the corresponding pending job;

creating an optimized list comprising optimized combinations of batch size and number of computing nodes for running both (iii) the jobs currently running and (iv) the pending jobs on the distributed system, wherein batch size/number of computing node combinations for the pending jobs are based upon the list of runtime estimations for the corresponding pending job;

determining that the distributed system comprises sufficient computing resources to execute the optimized list; and thereafter scheduling both (v) the jobs currently running and (vi) the pending jobs on the distributed system, wherein the scheduling comprises reallocating the computing resources of the distributed system to execute the optimized list.

* * * * *